US011125298B2

(12) United States Patent
Dobinson et al.

(10) Patent No.: US 11,125,298 B2
(45) Date of Patent: Sep. 21, 2021

(54) SHOCK ABSORBER

(71) Applicant: Birkgrove Pty Ltd., North Rockhampton (AU)

(72) Inventors: Adam Reginald Dobinson, North Rockhampton (AU); Benjamin Luke Dobinson, North Rockhampton (AU); Christopher Glen Dobinson, North Rockhampton (AU)

(73) Assignee: Birkgrove Pty Ltd., North Rockhampton (AU)

( * ) Notice: Subject to any disclaimer, the term of this patent is extended or adjusted under 35 U.S.C. 154(b) by 92 days.

(21) Appl. No.: 16/510,827

(22) Filed: Jul. 12, 2019

(65) Prior Publication Data

US 2020/0072312 A1 Mar. 5, 2020

(30) Foreign Application Priority Data

Aug. 31, 2018 (AU) .................................. 2018903229

(51) Int. Cl.
*F16F 9/346* (2006.01)
*F16F 9/06* (2006.01)
(Continued)

(52) U.S. Cl.
CPC ................ *F16F 9/067* (2013.01); *F16F 9/19* (2013.01); *F16F 9/3235* (2013.01);
(Continued)

(58) Field of Classification Search
CPC .. F16F 9/067; F16F 9/19; F16F 9/3235; F16F 9/3485; F16F 9/446; F16F 9/48; F16F 9/346; F16F 9/3465; B60G 2500/11
(Continued)

(56) References Cited

U.S. PATENT DOCUMENTS 5,487,480 A * 1/1996 Page ........................ B61G 9/08
213/43
5,803,443 A * 9/1998 Chang .................. B60G 15/063
267/177

(Continued)

FOREIGN PATENT DOCUMENTS

AU 2014273843 A1 11/2015

*Primary Examiner* — Thomas W Irvin
(74) *Attorney, Agent, or Firm* — Schwegman Lundberg & Woessner, P.A.

(57) ABSTRACT

A position-sensitive shock absorber 1 comprising an internal fluid space 3, a piston 5 and fluid system 7. The piston divides the internal fluid space into a compression side 3a and a rebound side 3b. The fluid system fluidly connects the compression side to the rebound side. The fluid system comprises a chain 9 of three or more external fluid spaces 9a, 9b, 9c, 9d external to the internal fluid space, space flow-control-arrangements 27i, 27ii, 27iii, and passage arrangements 25a, 25b, 25c, 25d mutually spaced along the internal fluid space. Each of the space flow-control-arrangements is configured to mutually fluidly connect a respective adjacent two of the external fluid spaces. Each of the external fluid spaces has a respective one of the passage arrangements. Each of the passage arrangements comprises one or more passages opening to the internal fluid space. The piston is movable along the internal fluid space to at least one of pass (at least one of the passages) and at least restrict flow through at least one of the passages.

23 Claims, 2 Drawing Sheets

(51) Int. Cl.
*F16F 9/32* (2006.01)
*F16F 9/48* (2006.01)
*F16F 9/44* (2006.01)
*F16F 9/348* (2006.01)
*F16F 9/19* (2006.01)

(52) U.S. Cl.
CPC ............ *F16F 9/3485* (2013.01); *F16F 9/446* (2013.01); *F16F 9/48* (2013.01); *B60G 2500/11* (2013.01)

(58) Field of Classification Search
USPC .................................................. 188/287, 286
See application file for complete search history.

(56) References Cited

U.S. PATENT DOCUMENTS

| | | | |
|---|---|---|---|
| 6,296,092 B1 | 10/2001 | Marking et al. | |
| 6,648,109 B2 * | 11/2003 | Farr | F16F 9/062 188/285 |
| 6,883,650 B2 * | 4/2005 | van Wonderen | F16F 9/346 188/285 |
| 7,191,877 B2 | 3/2007 | Norgaard et al. | |
| 7,270,222 B1 * | 9/2007 | Aymar | F16F 9/461 188/285 |
| 7,628,259 B2 * | 12/2009 | Norgaard | F16F 9/3235 188/314 |
| 8,627,932 B2 * | 1/2014 | Marking | F16F 9/56 188/313 |
| 9,038,791 B2 * | 5/2015 | Marking | F16F 9/3235 188/314 |
| 9,140,325 B2 * | 9/2015 | Cox | B60G 11/14 |
| 9,366,307 B2 * | 6/2016 | Marking | B60G 13/08 |
| 9,784,333 B2 * | 10/2017 | Marking | F16F 9/065 |
| 10,400,847 B2 * | 9/2019 | Marking | F16F 9/3235 |
| 2004/0094376 A1 * | 5/2004 | van Wonderen | F16F 9/48 188/285 |
| 2007/0051573 A1 * | 3/2007 | Norgaard | F16F 9/3481 188/314 |
| 2008/0099968 A1 * | 5/2008 | Schroeder | B62K 25/08 267/166 |
| 2010/0252972 A1 * | 10/2010 | Cox | F16F 9/56 267/218 |
| 2012/0048665 A1 * | 3/2012 | Marking | F16F 9/3405 188/287 |

* cited by examiner

US 11,125,298 B2

SHOCK ABSORBER

CLAIM OF PRIORITY

This application claims the benefit of priority of Australia Patent Application No. 2018903229, filed on 31 Aug. 2018, the benefit of priority of which is claimed hereby, and which is incorporated by reference herein in its entirety.

FIELD OF THE INVENTION

The invention relates to position-sensitive shock absorbers.

BACKGROUND TO THE INVENTION

Shock absorbers are typically installed as part of a vehicle suspension system to absorb impacts and damp out undesirable oscillations.

Shock absorbers typically include a piston mounted to slide within a fluid space. The rate at which a shock absorber is compressed is referred to as piston speed. Simple shock absorbers provide a reaction force related to the piston speed, e.g. proportional to the square of the piston speed. Position-sensitive shock absorbers provide a reaction force related to both piston speed and piston position whereby the dampening characteristics vary depending on the extent to which the vehicle suspension system is compressed.

Selecting and tuning an appropriate shock absorber can make a dramatic difference to a vehicle's performance. Moreover, the ideal shock absorber for any particular situation varies based on a huge range of factors including details of the vehicle, the weight of the cargo to be carried by the vehicle, the terrain to be traversed, the speed at which the terrain is to be traversed and driver preferences. Accordingly, it is highly desirable to provide a shock absorber with features by which workshops familiar with shock absorbers can tune the performance and it is also desirable to provide a design architecture that gives designers freedom to adopt a range of such features (e.g. various different types of valves) as required.

The shock absorbers used in four-wheel drives (as they are known in Australia, or off-road SUVs as they are known in the United States) can be subjected to very harsh conditions such as heavily corrugated roads and square-edged bumps. As such, it is desirable for shock absorbers to be simple, robust and serviceable.

In view of the preceding discussion, the present invention seeks to provide improvements in and for shock absorbers, or at least to provide useful alternatives for those concerned with shock absorbers.

U.S. Pat. No. 6,296,092 discloses a cylinder defining a fluid space in which a piston is housed. A further cylinder surrounds this cylinder. The two cylinders together define a bypass channel into which bypass openings open from the fluid space. Some of the bypass openings are covered by expandable bands.

Australian Patent No. 2014273843 discloses a shock absorber having a fluid distributor defining a plurality of conduits. Each conduit is adapted to communicate working fluid from one aperture open to a working chamber to one bypass passage (or vice versa).

U.S. Pat. No. 7,191,877 discloses a position-sensitive shock absorber having parallel bypass passages.

It is not admitted that any of the information in this patent specification is common general knowledge, or that the person skilled in the art could be reasonably expected to ascertain or understand it, regard it as relevant or combine it in any way before the priority date.

SUMMARY

One aspect of the invention provides a position-sensitive shock absorber comprising
   an internal fluid space;
   a piston dividing the internal fluid space into a compression side and a rebound side; and
   a fluid system to fluidly connect the compression side to the rebound side;
   the fluid system comprising
      a chain of three or more external fluid spaces external to the internal fluid space;
      space flow-control-arrangements; and
      passage arrangements mutually spaced along the internal fluid space;
   each of the space flow-control-arrangements being configured to mutually fluidly connect a respective adjacent two of the external fluid spaces;
   each of the external fluid spaces having a respective one of the passage arrangements;
   each of the passage arrangements comprising one or more passages opening to the internal fluid space;
   the piston being movable along the internal fluid space to at least one of
      pass at least one of the passages, and
      at least restrict flow through at least one of the passages.

Optionally a tubular inner defines the internal fluid space. A tubular outer may embrace the tubular inner. Preferably the tubular inner and tubular outer together define an intermediate space partitioned by partitioning portions to define the external fluid spaces.

Another aspect of the invention provides a position-sensitive shock absorber comprising
   an internal fluid space;
   a piston dividing the internal fluid space into a compression side and a rebound side;
   a fluid system to fluidly connect the compression side to the rebound side;
   a tubular inner defining the internal fluid space; and
   a tubular outer embracing the tubular inner;
   the fluid system comprising
      a chain of two or more external fluid spaces external to the internal fluid space;
      space flow-control-arrangements; and
      passage arrangements mutually spaced along the internal fluid space;
   each of the space flow-control-arrangements being configured to mutually fluidly connect a respective adjacent two of the external fluid spaces;
   each of the fluid spaces having a respective one of the passage arrangements;
   each of the passage arrangements comprising one or more passages opening to the internal fluid space;
   the piston being movable along the internal fluid space to at least one of
      pass at least one of the passages; and
      at least restrict flow through at least one of the passages;
   the tubular inner and tubular outer together defining an intermediate space partitioned by partitioning portions to define the external fluid spaces.

Preferably at least most of the passages are holes formed in the tubular inner.

Optionally an integral body of material defines at least most of the partitioning portions, and one of the tubular inner and the tubular outer.

The tubular outer is preferably an integral body of material.

Optionally at least most of an exterior of the tubular inner is substantially cylindrical. Optionally at least most of an interior of the tubular outer is substantially cylindrical.

The tubular outer is preferably externally threaded.

The piston is preferably movable to pass at least one of the passages, and most preferably is movable to pass at least one of the passage arrangements.

Optionally at least one of the space flow-control-arrangements includes a first one-way valve to permit flow from a first of the external fluid spaces toward a second of the external fluid spaces. Preferably the at least one of the space flow-control-arrangements includes a second one-way valve to permit flow from the second of the external fluid spaces toward the first of the external fluid spaces.

The position-sensitive shock absorber preferably includes a floating piston to separate a working fluid from a gas. Optionally the floating piston is within the tubular inner. Alternatively, an external reservoir may comprise the floating piston, in which case an externally-adjustable reservoir-flow-control-arrangement may connect the internal fluid space to a working fluid space of the reservoir.

Preferably at least one of the space flow-control-arrangements is shimmed, or more preferably shimmed in both directions.

Optionally the piston includes a piston flow-control-arrangement to fluidly connect the compression side to the rebound side in at least one direction. Preferably the piston flow-control-arrangement is externally adjustable.

Another aspect of the invention provides a coilover comprising a position-sensitive shock absorber.

Another aspect of the invention provides a vehicle comprising a position-sensitive shock absorber.

Another aspect of the invention provides a method of assembling a position-sensitive shock absorber;
a tubular inner defining an internal fluid space for a piston;
one or more partitioning portions each carrying a space flow-control-arrangement;
the one or more partitioning portions being on one of
an exterior of the tubular inner and
an interior of a tubular outer; and
the method comprising relatively-inserting the tubular inner into the tubular outer to at least partly define two or more external fluid spaces, of a chain of fluid spaces, external to the internal fluid space.

Preferably the one or more partitioning portions are on the exterior of the tubular inner.

DESCRIPTION OF EMBODIMENTS

Figures 1, 2:
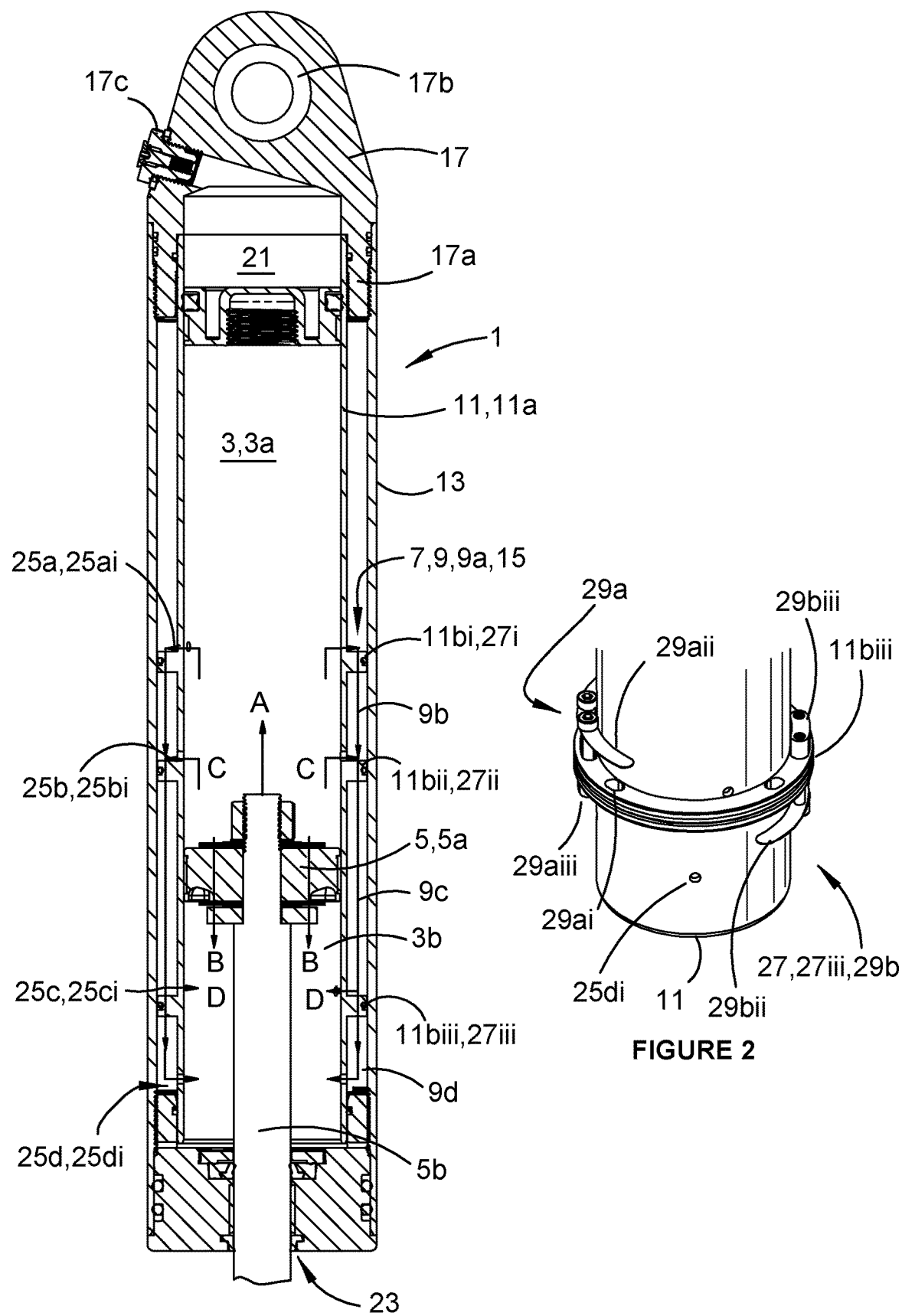
FIG. 1 is an axial cross-section view of a shock absorber body.
FIG. 2 is an exploded view of a portion of an inner assembly.

FIG. 1 illustrates a position-sensitive shock absorber 1 comprising an internal fluid space 3 (aka 'piston chamber'), a piston 5 and a fluid system 7. The piston divides the internal fluid space 3 into a compression side 3a and a rebound side 3b. The fluid system 7 fluidly connects the compression side 3a to the rebound side 3b.

The fluid system 7 comprises a chain 9 of fluid spaces 9a, 9b, 9c, 9d external to the internal fluid space 3. The internal fluid space 3 is defined by a tubular inner 11 which in this example comprises a cylindrical wall 11a and rings 11b embracing the exterior of, and being mutually spaced along, the wall 11a. In this example, inner 11 is a single integral body machined from aluminium. Different shapes and constructions are possible. By way of example, the inner 11 might have a non-circular profile, and the rings may be separate pieces mechanically fixed to the wall 11a. Each of the rings 11b defines a respective O-ring groove and carries a respective O-ring about its outer periphery.

The inner 11 is embraced by a tubular outer 13. In this example, the outer 13 is formed by extrusion and post-extrusion machining operations. The outer 13 is concentric to the inner 11 whereby an annular intermediate space 15 is defined therebetween. The rings 11b constitute partitioning portions partitioning the intermediate space 15 into the fluid spaces 9a, 9b, 9c, 9d of the chain 9. The O-rings carried by rings 11b sealingly engage the interior of the outer 13. Other sealing arrangements are possible.

The shock absorber 1 further includes a top cap 17 including a downwardly-extending cylindrical wall 17a. The wall 17a is both internally and externally threaded and carries suitable seals to enable it to be screwed into the intermediate space 15 and thereby sealingly engage and mechanically retain the inner 11 and outer 13.

The top cap 17 further includes a rose joint 17b and a gas port 17c. The rose joint 17b is a mounting arrangement by which the shock absorber is mountable to a first portion of a suspension system. Other mounting arrangements are possible.

A floating piston 19 sits within the inner 11 and separates substantially incompressible working fluid within the internal fluid space 3 from gas within a gas space 21. The port 17c enables gas (e.g. nitrogen) to be supplied to the space 21.

The piston 5 includes a piston head 5a and a piston rod 5b. The piston rod leaves the internal fluid space 3 via a sealed exit 23 for connection to a second mounting feature (e.g. rose joint) by which the shock absorber is mountable to a second portion of the suspension system movable relative to the first portion of the suspension system. Preferably the piston rod 5b has an internally threaded lower end to receive an externally threaded boss of a mounting head, whereby the externally threaded boss is partly received within the body of the shock absorber 1 at full compression. The female lower end of the rod thus serves to reduce the dead length of the shock absorber (i.e. improve the stroke to overall length ratio of the shock absorber).

In this example, the piston head 5 is shimmed in both directions to enable controlled flow therethrough both on compression and rebound strokes. Other arrangements are possible. Other variants of the shock absorber 1 may have an impermeable piston head 5a, in which case the external fluid system 7 may provide the sole fluid connection between the compression side 3a and rebound side 3b.

The floating piston 19 and gas space 21 provide compliance to accommodate the volume displaced by the piston rod 5b as it enters the internal fluid space 3 during the compression stroke.

Each of the fluid spaces 9a, 9b, 9c, 9d has a respective passage arrangement opening to the internal fluid space 3. In this example, each of the passage arrangements 25a, 25b, 25c, 25d comprises a respective set of simple holes 25ai, 25*bi*, 25*ci*, 25*di* through, and about, the cylindrical wall 11*a* at a respective common axial location along the shock absorber.

Each of the rings 11*b* carries a respective flow-control-arrangement (FIG. 2) for mutually connecting the mutually adjacent fluid spaces. FIG. 2 illustrates the flow-control-arrangement 27*iii* carried by the ring 11*biii* for mutually connecting the fluid spaces 9*c*, 9*d*.

The flow-control-arrangement 27*iii* includes a pair of shimmed flow ports 29*a*, 29*b*.

The flow port 29*a* includes a port 29*ai* opening axially through the ring 11*biii* and a shim 29*aii* for selectively closing the port 29*ai* to flow in one direction (in this case, to flow from the space 9*c* to the space 9*d*).

The ring 11*biii* includes a pair of stepped-profiled kidney bores into which kidney-shaped nuts 29*aiii*, 29*biii* are respectively insertable. The shim 29*aii* is bolted to the nut 29*aiii* so that in its free state it lies flat against the planar axial-facing surface of the ring 11*biii*. When pressure within the space 9*d* rises a threshold above the pressure within the space 9*c*, the shim 29*aiii* is deflected to open the port 29*ai* to permit flow therethrough. In this example, the shim 29*aii* is configured to substantially occlude the port 29*ai*, whereby the shimmed port arrangement 29*a* is a one-way valve. Other versions of the shock absorber may have shimmed ports, each port of which permits flow in both directions but offers directionally-dependent resistance.

Workshops familiar with shock absorbers are familiar with shimmed ports. Moreover, shimmed ports are simple and robust. As such, tuning the characteristics of the shimmed flow port 29*a* is within the skill of workshops familiar with shock absorbers.

The arrangement 27*iii* is but one example of a flow-control-arrangement by which an adjacent two of the external fluid spaces may be mutually connected. In a simple case, the flow-control-arrangement might simply take the form of a small hole. Alternatively, any convenient valving arrangement might be adopted, e.g. the flow control arrangement might include one or more of a ball-check valve and a needle valve.

In contrast to parallel-bypass arrangements, there is ample room on the ring 11*biii* for a variety of valve arrangements, thereby giving designers freedom to choose suitable valving arrangements for a wide range of applications. At the same time, axially spaced zones of the internal fluid space 3 associated with the fluid spaces 9*a*, 9*b*, 9*c*, 9*d* can be separately valved for improved tuning. In contrast, parallel-bypass arrangements can have very 'crowded' designs, thereby restricting the designer's choice of valving arrangement.

FIG. 1 illustrates the shock absorber 1 during its compression stroke. The piston 5 is moving within the internal fluid space 3 in the direction suggested by arrow A. This reduces the volume of the compression side 3*a* and increases the volume of the rebound side 3*b*. The displaced working fluid is thus driven from the compression side 3*a* to the rebound side 3*b* via the piston head 5*a* as suggested by arrows B, and also via the fluid system 7. As suggested by arrows C and D, fluid is driven from the compression side 3*a* in sequence through the space 9*b*, ring 11*bii* and space 9*c*. As such, in this portion of the stroke, the dampening characteristics are dependent upon the characteristics of the flow-control-arrangement 27*ii* associated with the ring 11*bii*.

As the piston head 5*a* moves into register with the passage arrangement 25*b*, thereby restricting flow through the passages 25*bi*, the dampening characteristics will change. With ongoing movement, the head 5*a* passes the passages 25*bi*, whereby those passages are disconnected from the compression side 3*a* and connected to the rebound side 3*b*. At this juncture, the flow control arrangement 27*i* associated with the ring 11*bi* will impact upon the dampening characteristics.

In the illustrated example, the passage arrangements 25*a*, 25*b*, 25*c*, 25*d* have impedances which are small relative to the impedances of the flow-control-arrangements 27*i*, 27*ii*, 27*iii*. As such, each of the fluid spaces 9*a*, 9*b*, 9*c*, 9*d* will typically be at substantially the same pressure as the compression side 3*a* or rebound side 3*b* to which it is connected. In turn, in the illustrated variant, typically only one of the flow-control-arrangements 27*i*, 27*ii*, 27*iii* will be operative at any given time. By way of example, in the position illustrated in FIG. 1, fluid spaces 9*a*, 9*b* are at a common pressure (corresponding to the pressure within space 3*a*) whereby there is negligible flow therebetween. Of course, other arrangements are possible. Different relative impedances are possible.

According to the illustrated example, adjacent fluid spaces of the chain 9 are mutually connected by respective ones of the flow-control-arrangements 27 to form the chain 9. As the piston 5 moves along the internal fluid space 3, and so along the chain 9, it co-operates with the flow-control-arrangements in turn. Each of the flow-control-arrangements 27 is thereby simply and intuitively relatable to a respective zone of the piston's travel. By way of example, compression-dampening within the zone defined by the passage arrangements 25*c*, 25*d* may be increased by adding a further shim to reinforce the shim 29*bii* (or replacing shim 29*bii* with a thicker shim). Advantageously, the shim ports 29*a*, 29*b* are separately adjustable, allowing the compression and rebound dampening to be adjusted independently.

Integrally forming the partitioning portions (the rings 11*bi*, 11*bii*, 11*biii* in this case) on the inner 11 and then sliding the inner 11 into the outer 13 is a simple and convenient mode of construction that may be usefully applied even in the context of shock absorbers having only a single partitioning portion. Other variations of the concept are possible. By way of example, the partitioning portions may be fixed to the interior of the outer 13 or mounted in some other way.

Each of the fluid spaces 9*a*, 9*b*, 9*c*, 9*d* is a respective annular space fully surrounding the internal fluid space 3. Other options are possible. In other variants of the shock absorber, each of these spaces may have a different shape, e.g. may embrace only half or some other portion of the internal fluid space 3. These are but examples of potential implementations of the described technology. Other implementations may take different forms, e.g. the passage arrangements may take the form of flexible conduits.

Figure 3:
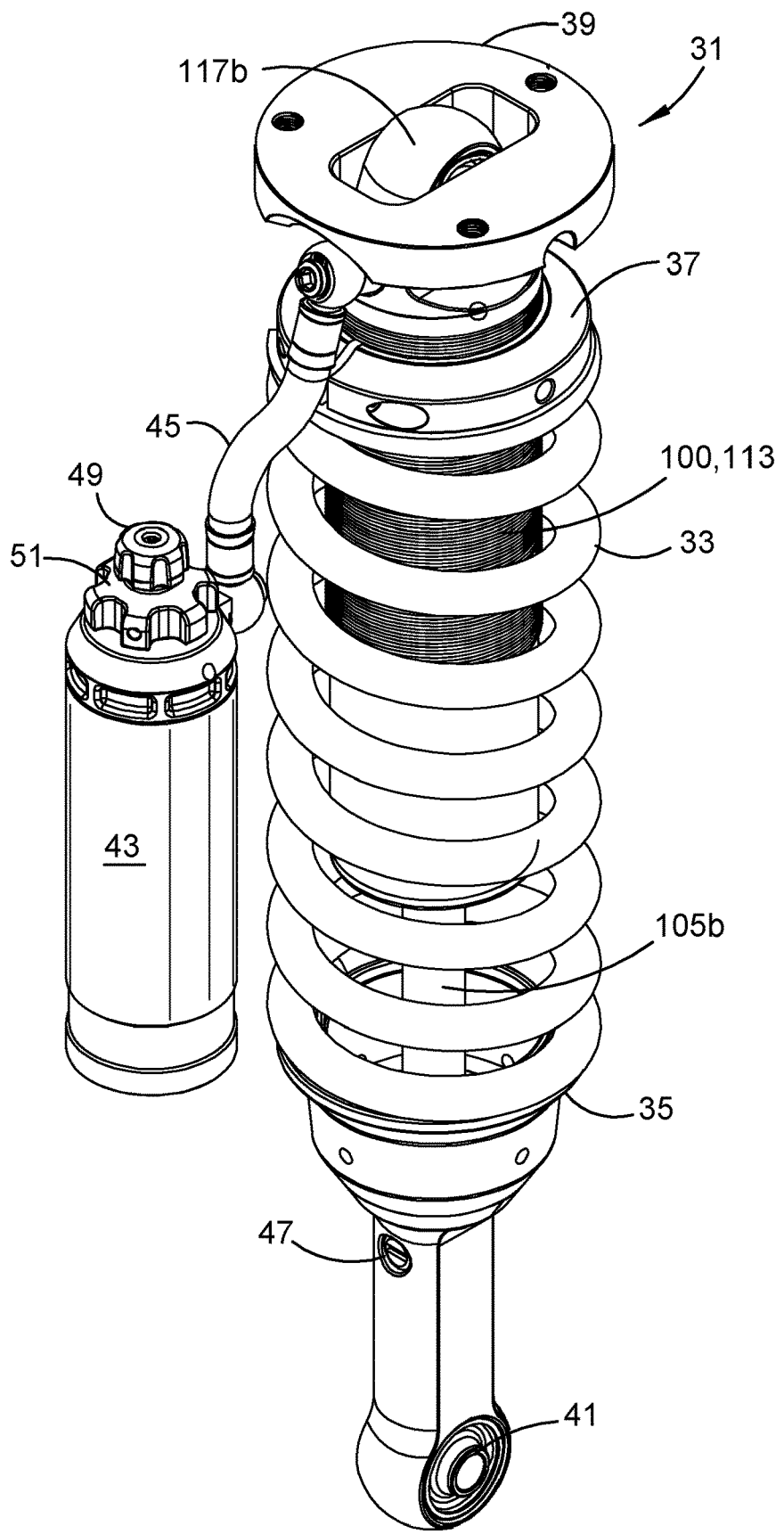
FIG. 3 is a perspective view of a coilover.

FIG. 3 illustrates a coilover 31 incorporating a shock absorber 100 embraced by a helical suspension spring 33. The spring 33 is the main load-bearing spring that bears the weight of the vehicle supported by the coilover 31.

The shock absorber 100 has an inner (not shown), an external fluid system (not shown) and an outer 113 akin to the inner 11, external fluid system 7 and outer 13 of the shock absorber 1. An outer end of a piston rod 105*b* carries a spring seat 35. An exterior of the outer 113 is threaded.

The spring 33 is a compression spring compressed between the spring seat 35 and a second spring seat 37. The spring seat 37 embraces and threadingly engages the outer 113 whereby its axial position is adjustable along the shock absorber 311 to adjust the ride height of the vehicle.

A mounting arrangement, rose joint 117*b* in this case, co-operates with a mounting plate 39 by which the coilover 31 is mountable to a strut tower of the vehicle. A lower end of the piston rod 105b carries a rose joint 41 for connection to a suspension arm. The shock absorber 100 incorporates an external reservoir 43 in place of the internal floating piston 19 and internal gas base 21 of the shock absorber 1. A flexible conduit 45 connects a working fluid space within the reservoir 43 to the main working fluid space (akin to the internal fluid space 3) of the shock absorber 100. A floating piston carried within the reservoir 43 separates the working fluid from a gas space within the reservoir 43.

As such, volume changes within the main body of the shock absorber associated with the volume of the rod 105b result in flow through the conduit 45 to and from the reservoir 43.

The coilover 31 is externally adjustable, meaning that its dampening characteristics can be adjusted whilst the shock absorber remains in situ (e.g. in situ on a vehicle). In this example, the externally-accessible adjustment features are exposed. Other externally-adjustable shock absorbers may have dust covers, etc, removable to facilitate the adjustment.

The coilover 31 is three-way adjustable. Rebound adjustment is effected by turning an adjustment screw 47 associated with the piston rod 105. The adjustment screw 47 runs transverse to the piston rod 105b and has a conical surface co-operable with an adjustment rod concentrically carried within the piston rod 105b. One end of the adjustment rod co-operates with the conical surface whereby turning the screw 47 axially relocates the adjustment rod. The other end of the adjustment rod is fixed to a needle of a needle valve along a flow path through the piston 5 from the compression side to the rebound side. In this example, a check valve is mounted along that flow path to close the path to compression flow. Some variants may omit the check valve whereby the screw 47 is turnable to simultaneously adjust both compression and rebound damping.

The reservoir 43 has a pair of adjustment knobs 49, 51 for low-speed and high-speed compression adjustment. The knob 49 adjusts a needle valve to provide the low-speed compression adjustment. The knob 51 adjusts the opening point of a shimmed valve arrangement to provide the high-speed compression adjustment. A one-way valve arrangement enables working fluid to exit the reservoir 43 along the conduit 45 substantially unimpeded.

The person of skill in the art will appreciate that other modes of adjustment are possible.

A preferred product range includes both coilover and non-coilover variants of:
the shock absorber 1;
a variant of the shock absorber 1 with the adjustment screw 47 (without an associated check valve) to adjust both compression and rebound dampening; and
the three-way adjustable shock absorber 100.

The invention is not limited to the described examples. Rather, the invention is defined by the claims. By way of example, whilst vehicular shock absorbers have been illustrated, other variants of the technology may be suited to non-vehicular applications.

The term 'comprises' and its grammatical variants has a meaning that is determined by the context in which it appears. Accordingly, the term should not be interpreted exhaustively unless the context dictates so.

What is claimed is:
1. A position-sensitive shock absorber comprising:
an internal fluid space;
a piston dividing the internal fluid space into a compression side and a rebound side; and
a fluid system to fluidly connect the compression side to the rebound side, the fluid system comprising:
a chain of three or more external fluid spaces external to the internal fluid space;
space flow-control-arrangements; and
passage arrangements mutually spaced along the internal fluid space;
wherein each of the space flow-control-arrangements is configured to mutually fluidly connect a respective adjacent two of the external fluid spaces;
wherein each of the external fluid spaces has a respective one of the passage arrangements;
wherein each of the passage arrangements comprises one or more passages opening to the internal fluid space;
wherein the piston is movable along the internal fluid space to at least one of:
pass at least one of the passages; and
at least restrict flow through at least one of the passages, and
wherein at least one of the space flow-control-arrangements comprises at least one valve.

2. The position-sensitive shock absorber of claim 1 comprising:
an inner tube defining the internal fluid space; and
an outer tube embracing the inner tube;
wherein the inner tube and outer tube together define an intermediate space partitioned by partitioning portions to define the external fluid spaces.

3. The position-sensitive shock absorber of claim 2 wherein at least most of the passages are holes formed in the inner tube.

4. The position-sensitive shock absorber of claim 2 including an integral body of material defining:
at least most of the partitioning portions, and
one of the inner tube and the outer tube.

5. The position-sensitive shock absorber of claim 2 including an integral body of material defining:
at least most of the partitioning portions, and
the inner tube.

6. The position-sensitive shock absorber of claim 2 wherein the outer tube is an integral body of material.

7. The position-sensitive shock absorber of claim 2 wherein at least most of an exterior of the inner tube is substantially cylindrical.

8. The position-sensitive shock absorber of claim 2 wherein at least most of an interior of the outer tube is substantially cylindrical.

9. The position-sensitive shock absorber of claim 2 wherein the outer tube is externally threaded.

10. The position-sensitive shock absorber of claim 2 including a floating piston within the inner tube to separate a working fluid from a gas.

11. The position-sensitive shock absorber of claim 1 including a floating piston to separate a working fluid from a gas.

12. The position-sensitive shock absorber of claim 11 including an external reservoir comprising the floating piston.

13. The position-sensitive shock absorber of claim 1 wherein the piston is movable to pass at least one of the passages.

14. The positive-sensitive shock absorber of claim 1 wherein the piston is movable to pass at least one of the passage arrangements.

15. The position-sensitive shock absorber of claim 1 wherein at least one of the space flow-control-arrangements includes a first one-way valve to permit flow:

from a first of the external fluid spaces,
toward a second of the external fluid spaces.

16. The position-sensitive shock absorber of claim 15 wherein the at least one of the space flow-control-arrangements includes a second one-way valve to permit flow:
from the second of the external fluid spaces,
toward the first of the external fluid spaces.

17. The position-sensitive shock absorber of claim 1 wherein at least one of the space flow-control-arrangements is shimmed.

18. The position-sensitive shock absorber of claim 1 wherein at least one of the space flow-control-arrangements is shimmed in both directions.

19. The position-sensitive shock absorber of claim 1 wherein the piston includes a piston flow-control-arrangement to fluidly connect the compression side to the rebound side in at least one direction.

20. A position-sensitive shock absorber comprising:
an internal fluid space;
a piston dividing the internal fluid space into a compression side and a rebound side;
a fluid system to fluidly connect the compression side to the rebound side, the fluid system comprising:
a chain of two or more external fluid spaces external to the internal fluid space;
space flow-control-arrangements; and
passage arrangements mutually spaced along the internal fluid space;
an inner tube defining the internal fluid space; and
an outer tube embracing the inner tube;
wherein each of the space flow-control-arrangements is configured to mutually fluidly connect a respective adjacent two of the external fluid spaces;
wherein each of the fluid spaces has a respective one of the passage arrangements;
wherein each of the passage arrangements comprises one or more passages opening to the internal fluid space;
wherein the piston is movable along the internal fluid space to at least one of:
pass at least one of the passages, and
at least restrict flow through at least one of the passages;
wherein the inner tube and outer tube together define an intermediate space partitioned by partitioning portions to define the external fluid spaces, and
wherein at least one of the space flow-control-arrangements comprises at least one valve.

21. A position-sensitive shock absorber comprising:
an internal fluid space;
a piston dividing the internal fluid space into a compression side and a rebound side; and
a fluid system to fluidly connect the compression side to the rebound side, the fluid system comprising:
a chain of three or more external fluid spaces external to the internal fluid space;
space flow-control-arrangements; and
passage arrangements mutually spaced along the internal fluid space;
a floating piston to separate a working fluid from a gas; and
an external reservoir comprising the floating piston;
an externally-adjustable reservoir-flow-control-arrangement connecting the internal fluid space to a working fluid space of the reservoir;
wherein each of the space flow-control-arrangements is configured to mutually fluidly connect a respective adjacent two of the external fluid spaces;
wherein each of the external fluid spaces has a respective one of the passage arrangements;
wherein each of the passage arrangements comprises one or more passages opening to the internal fluid space; and
wherein the piston is movable along the internal fluid space to at least one of:
pass at least one of the passages; and
at least restrict flow through at least one of the passages.

22. A position-sensitive shock absorber comprising
an internal fluid space;
a piston dividing the internal fluid space into a compression side and a rebound side; and
a fluid system to fluidly connect the compression side to the rebound side, the fluid system comprising:
a chain of three or more external fluid spaces external to the internal fluid space;
space flow-control-arrangements; and
passage arrangements mutually spaced along the internal fluid space;
wherein each of the space flow-control-arrangements is configured to mutually fluidly connect a respective adjacent two of the external fluid spaces;
wherein each of the external fluid spaces has a respective one of the passage arrangements;
wherein each of the passage arrangements comprises one or more passages opening to the internal fluid space;
wherein the piston is movable along the internal fluid space to at least one of:
pass at least one of the passages; and
at least restrict flow through at least one of the passages;
wherein the piston includes a piston flow-control-arrangement to fluidly connect the compression side to the rebound side in at least one direction; and
wherein the piston flow-control-arrangement is externally adjustable.

23. A coilover comprising a position-sensitive shock absorber, the position-sensitive shock absorber comprising:
an internal fluid space;
a piston dividing the internal fluid space into a compression side and a rebound side; and
a fluid system to fluidly connect the compression side to the rebound side, the fluid system comprising:
a chain of three or more external fluid spaces external to the internal fluid space;
space flow-control-arrangements; and
passage arrangements mutually spaced along the internal fluid space;
wherein each of the space flow-control-arrangements is configured to mutually fluidly connect a respective adjacent two of the external fluid spaces;
wherein each of the external fluid spaces has a respective one of the passage arrangements;
wherein each of the passage arrangements comprises one or more passages opening to the internal fluid space;
wherein the piston is movable along the internal fluid space to at least one of:
pass at least one of the passages; and
at least restrict flow through at least one of the passages; and
wherein at least one of the space-flow-control-arrangements comprises at least one valve.

* * * * *

UNITED STATES PATENT AND TRADEMARK OFFICE
CERTIFICATE OF CORRECTION

PATENT NO. : 11,125,298 B2
APPLICATION NO. : 16/510827
DATED : September 21, 2021
INVENTOR(S) : Dobinson et al.

Page 1 of 1

It is certified that error appears in the above-identified patent and that said Letters Patent is hereby corrected as shown below:

In the Claims

In Column 8, Line 62, in Claim 14, delete "positive-sensitive" and insert --position-sensitive-- therefor Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*